United States Patent
Thomas et al.

(10) Patent No.: US 12,489,913 B2
(45) Date of Patent: Dec. 2, 2025

(54) PARTIAL OUTPUT OF A DECODED PICTURE BUFFER IN VIDEO CODING

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Emmanuel Thomas, Delft (NL); Alexandre da Silva Pratas Gabriel, The Hague (NL); Hendrikus Nathaniël Hindriks, Gouda (NL); Emmanouil Potetsianakis, The Hague (NL)

(73) Assignees: Koninklijke KPN N.V., Rotterdam (NL); Nederlandse Ogranisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 201 days.

(21) Appl. No.: 17/790,024

(22) PCT Filed: Dec. 29, 2020

(86) PCT No.: PCT/EP2020/087986
§ 371 (c)(1),
(2) Date: Jun. 29, 2022

(87) PCT Pub. No.: WO2021/136783
PCT Pub. Date: Jul. 8, 2021

(65) Prior Publication Data

US 2023/0049909 A1    Feb. 16, 2023

Related U.S. Application Data

(60) Provisional application No. 62/955,697, filed on Dec. 31, 2019.

(51) Int. Cl.
| | | |
|---|---|---|
| *H04N 19/44* | (2014.01) | |
| *H04N 19/433* | (2014.01) | |
| *H04N 19/70* | (2014.01) | |

(52) U.S. Cl.
CPC ........... *H04N 19/44* (2014.11); *H04N 19/433* (2014.11); *H04N 19/70* (2014.11)

(58) Field of Classification Search
CPC .. H04N 19/117; H04N 19/127; H04N 19/167; H04N 19/174; H04N 19/176;
(Continued)

(56) References Cited

U.S. PATENT DOCUMENTS

| | | | |
|---|---|---|---|
| 10,003,815 B2 * | 6/2018 | Ramasubramonian | ........................ H04N 19/30 |
| 11,228,775 B2 * | 1/2022 | Xu | ........................ H04N 19/105 |

(Continued)

FOREIGN PATENT DOCUMENTS

| | | |
|---|---|---|
| EP | 2884744 A1 | 6/2015 |
| EP | 3 151 566 A1 | 4/2017 |

(Continued)

OTHER PUBLICATIONS

Annex C of the HEVC specification published as ISO/IEC 23008-2 and Recommendation ITU-T H.265 (Nov. 2019).

(Continued)

*Primary Examiner* — Peter D Le
(74) *Attorney, Agent, or Firm* — Hamilton, Brook, Smith & Reynolds, P.C.

(57) ABSTRACT

A method of processing video data of a picture is described, the method including: allocating memory for a decoded picture in a decoded picture buffer, DPB, the decoded picture comprising pixels representing video data; receiving a bitstream comprising decoding units, DUs, and storing the DUs in a coded picture buffer, CRB, the DUs representing (Continued)

a coded picture that needs to be decoded into the decoded picture, each of the DUs representing a coded block of pixels; determining if, during decoding of the coded picture, at least one partial output can be performed, the at least one partial output including copying the one or more decoded DUs from the DPB to a data sink, while one or more DUs of the coded picture are not yet decoded and removed the CPB, the one or more decoded DUs representing a part of the decoded picture; and, or performing the at least one partial output if the processor determines that the at least one partial output can be performed, the performing including marking the one or more decoded DUs stored in the DPB as being ready for partial output, the marking signaling the decoder apparatus not to remove the one or more decoded DUs from the DPB; and, copying the one or more marked decoded DUs from the DPB to the data sink without removing the one or more decoded DU from the DPB.

13 Claims, 9 Drawing Sheets

(58) Field of Classification Search
CPC .... H04N 19/423; H04N 19/433; H04N 19/44; H04N 19/70
See application file for complete search history.

(56) References Cited

U.S. PATENT DOCUMENTS

| | | | | |
|---|---|---|---|---|
| 11,695,965 B1* | 7/2023 | Sánchez De La Fuente | | H04N 19/109 |
| | | | | 375/240.02 |
| 2005/0204385 A1* | 9/2005 | Sull | | G11B 27/105 |
| | | | | 725/35 |
| 2006/0262345 A1* | 11/2006 | Le Leannec | | H04N 21/235 |
| | | | | 348/E7.071 |
| 2007/0171975 A1 | 7/2007 | Smith et al. | | |
| 2008/0002773 A1* | 1/2008 | Lai | | H04N 19/44 |
| | | | | 375/E7.094 |
| 2008/0069247 A1* | 3/2008 | He | | H04N 19/865 |
| | | | | 375/240.29 |
| 2008/0219347 A1* | 9/2008 | Nakamura | | G11B 27/005 |
| | | | | 375/E7.258 |
| 2010/0034288 A1* | 2/2010 | Chang | | H04N 19/433 |
| | | | | 375/E7.027 |
| 2010/0189181 A1* | 7/2010 | Zheng | | H04N 19/70 |
| | | | | 375/240.24 |
| 2010/0189182 A1* | 7/2010 | Hannuksela | | H04N 19/132 |
| | | | | 375/E7.003 |
| 2012/0106644 A1 | 5/2012 | Henry et al. | | |
| 2012/0201475 A1* | 8/2012 | Carmel | | H04N 19/40 |
| | | | | 382/238 |
| 2013/0266076 A1* | 10/2013 | Wang | | H04N 19/44 |
| | | | | 375/240.25 |
| 2013/0279600 A1* | 10/2013 | Toma | | H04N 19/70 |
| | | | | 375/240.25 |
| 2014/0072038 A1* | 3/2014 | Samuelsson | | H04N 19/31 |
| | | | | 375/240.12 |
| 2014/0092964 A1* | 4/2014 | Ugur | | H04N 19/107 |
| | | | | 375/240.12 |
| 2014/0169448 A1 | 6/2014 | Wang | | |
| 2014/0192895 A1* | 7/2014 | Chen | | H04N 19/423 |
| | | | | 375/240.25 |
| 2014/0307775 A1* | 10/2014 | Ouedraogo | | H04N 19/159 |
| | | | | 375/240.02 |
| 2015/0016545 A1 | 1/2015 | Ramasubramonian et al. | | |
| 2015/0264406 A1* | 9/2015 | Kim | | H04N 19/182 |
| | | | | 375/240.29 |
| 2017/0142421 A1* | 5/2017 | Roh | | H04N 19/177 |
| 2018/0160122 A1* | 6/2018 | Xu | | H04N 19/176 |
| 2021/0385472 A1* | 12/2021 | Seregin | | H04N 19/30 |
| 2024/0056590 A1 | 2/2024 | Potetsianakis et al. | | |
| 2024/0056614 A1 | 2/2024 | Potetsianakis et al. | | |

FOREIGN PATENT DOCUMENTS

| | | |
|---|---|---|
| WO | 2022/144184 A1 | 7/2022 |
| WO | 2022/144244 A1 | 7/2022 |

OTHER PUBLICATIONS

Flynn, D. et al., "High Efficiency Video Coding (HEVC) Range Extensions text specification: Draft 2 (for PDAM)", Joint Collaborative Team on Video Coding (JCT-VC), 12th Meeting, Jan. 2013, 330 pages.

Sze et al. "High efficiency video coding (HEVC)." Integrated Circuit and Systems, Algorithms and Architectures. Springer 1-375 (2014).

International Search Report and Written Opinion for International Application No. PCT/EP2020/087986, entitled "Partial Output of a Decoded Picture Buffer in Video Coding,", consisting of 13 pages. Date Mailed: Feb. 23, 2021.

* cited by examiner

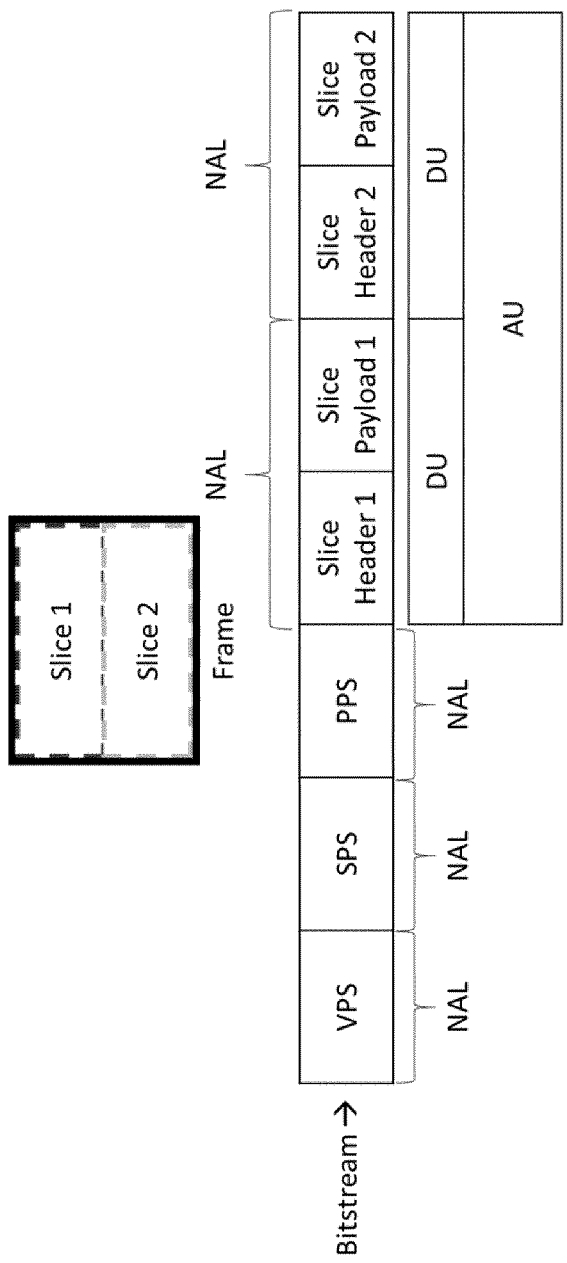
FIG. 2
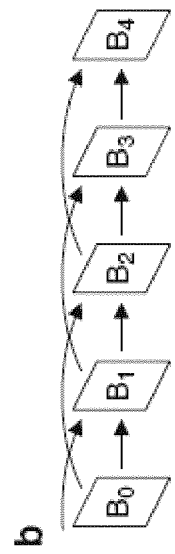
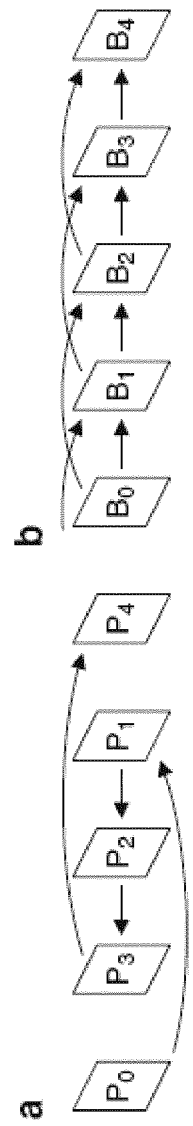
FIG. 3

PARTIAL OUTPUT OF A DECODED PICTURE BUFFER IN VIDEO CODING

This application is the U.S. National Stage of International Application No. PCT/EP2020/087986, filed Dec. 29, 2020, which designates the U.S., published in English, and claims the benefit of U.S. Provisional Application No. 62/955,697, filed Dec. 31, 2019. The entire teachings of the above applications are incorporated herein by reference.

FIELD OF THE INVENTION

The invention relates to partial output of a decoded picture buffer in video coding, and, in particular, though not exclusively, to methods and systems for partial output of a decoded picture buffer, a video decoder apparatus and a video encoder apparatus using such methods and a computer program product for executing such methods.

BACKGROUND OF THE INVENTION

State of the art video coding standards rely on a hypothetical decoder model that specifies the relation between an input buffer, a decoder process and an output buffer, wherein the input and output buffer and the decoder process belong to the decoder. For example, the HEVC standard defines in Annex C of the HEVC specification published as ISO/IEC 23008-2 the so-called hypothetical reference decoder (HRD) model. The HRD allows an encoder to specify the constraints of a bitstream to identify the capabilities needed to ensure that the bitstream can be correctly buffered, decoded, and output.

The HRD defines a coded picture buffer (CPB), an instantaneous decoding process and a decoded picture buffer (DPB). The input of the CPB is a bitstream comprising decoding units (DUs). DUs can be either access units (AU), i.e. a complete picture, or a subset of an AU, i.e. independent slice of an AU, representing a part of a picture. Thus, in the latter case, a plurality of DUs may define a full picture. The operation of the HRD includes an initialization wherein both the CPB and the DPB are being set to be empty and thereafter a hypothetical stream scheduler (HSS) delivers decoding units DUs to the CPB according to a specified arrival schedule. During decoding DUs are removed and decoded instantaneously by the instantaneous decoding process at the CPB removal time of the DU. Thereafter, each decoded picture is placed in the DPB and output according to a certain timing information.

A problem of the HRD model relates to the fact that it assumes instantaneous decoding. However, the time to decode all the DUs of a picture is not instantaneous in practice. The decoding takes time as parsing and decompressing the data will consume CPU cycles. Further, it takes time to add, process and remove the DUs, both in the CPB and DPB which also contributes to decoding time as well as the actual movement of bytes on a physical chip. The HRD model defines output at the level of an access unit, i.e. a whole picture. Hence, in principle DUs in the DPB are output from the DPB once all DUs forming the picture have been decoded.

However, nowadays many applications required fast access to the decoded data in the CPB. For example, some applications pack different video objects inside the same picture while these different objects do not necessarily have to be displayed together nor at the same time. One advantage of this packing into the same frames is that the different objects are time locked (synchronised) by design, by belonging to a single frame corresponding to a certain decoding timestamp, hence referring to point in time of the media timeline. But when these different video objects are packed together in the same picture, they become available to the application all at the same time as a single output picture after decoding. That is, the application has no fine access to each of these objects but can only access when the whole picture including its objects are decoded.

Similarly, when decoding omnidirectional content, such as a cube-map projected video, a picture contains different parts (faces) of a spherical video. During rendering the relevance of each face may depend on the current user's viewport. Hence, for a certain time instance, one or more faces may contain the pixels of a user's viewport while the other faces are not viewed by the user. As a result, it may be advantageous for the application to retrieve updated pixels in the user's viewport of the next frame as soon as possible so that the presented pictures can be refreshed at high rate.

Hence, from the above it follows there is a need in the art for improved video coding methods and video coding systems that allow an application fast access to decoded data in decoded pixel buffer of the decoder.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Additionally, the Instructions may be executed by any type of processors, including but not limited to one or more digital signal processors (DSPs), general purpose microprocessors, application specific integrated circuits (ASICs), field programmable logic arrays (FP-GAs), or other equivalent integrated or discrete logic circuitry.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The main insight of the embodiments in this disclosure in case each picture of a video contain multiple DUs, the decoder enables an output of a partial reconstruction of the full picture (a partial output of the decoded picture) before the entire picture is decoded, i.e. before all DUs of the picture are removed from the CPB. The embodiments described in this disclosure allow an application, e.g. VR application or an image post-processing application, to access a data sink comprising part of a picture stored in the DPB before the picture is entirely decoded. The invention thus enables an application to access a part of the decoded picture while other part of the picture, i.e. the DUs have arrived in the CPB or have not been removed from the CPB. This way, the application, e.g. a rendering process or a video processing step, may already start on the basis of part of the picture, while the full picture is not fully decoded.

In an aspect, the invention may relate to a method of processing video data of a picture, wherein the method may include one or more of the following steps: the processor of a decoding apparatus allocating memory for a decoded picture in a decoded picture buffer, DPB, the decoded picture comprising pixels representing video data; the processor receiving a bitstream comprising decoding units, DUs, and storing the DUs in a coded picture buffer, CPB, the DUs representing a coded picture that needs to be decoded into the decoded picture, each of the DUs representing a coded block of pixels; the processor determining if, during decoding of the coded picture, at least one partial output can be performed, the at least one partial output including copying the one or more decoded DUs from the DPB to a data sink, while one or more DUs of the coded picture are not yet decoded and removed the CPB, the one or more decoded DUs representing a part of the decoded picture; and, the processor performing the at least one partial output if the processor determines that the at least one partial output can be performed, the performing including: copying the one or more marked decoded DUs from the DPB to the data sink without removing the one or more decoded DU from the DPB.

In an embodiment, the performing of at least one partial output may include marking the one or more decoded DUs stored in the DPB as being ready for partial output, the marking signaling the decoder apparatus not to remove the one or more decoded DUs from the DPB.

In an embodiment, the performing of at least one partial output may include signaling an application associated with the data sink that the partial output of the DPB has been performed.

The invention thus allows a decoder apparatus to perform multiple outputs of decoded DUs during the decoding process of a picture. This way, an application can use and process decoded data of part of a picture as soon as the decoded data are available through the decoding process of the decoder apparatus.

In an embodiment, the determining if at least one partial output can be performed may include: determining if inloop-filtering of the picture is disabled or not.

In an embodiment, the determining if partial output can be performed may include: the processor receiving decoding information associated with the picture, preferably a SEI message, such as a picture timing SEI message, the decoding information including a partial output indicator, preferably partial output flag, for signaling the decoder apparatus if partial output of decoded DUs representing part of a decoded picture can be performed.

In an embodiment, the determining if partial output can be performed may include: the processor receiving decoding information associated with the picture, preferably a SEI message, such as a picture timing SEI message, the decoding information signaling the decoder apparatus that partial output can be performed if the bitstream should be processed on DU level as specified in HEVC or as a sub-picture as specified in VVC.

In an embodiment, the decoding information associated with the picture further includes timing information for performing the one or more partial outputs of the decoded DUs.

In an embodiment, the data sink may include a buffer that matches the size of a DU, wherein the transfer of at least part of the DPB to a data sink may include: copying the decoded DU in the DPO to the buffer of the data sink.

In an embodiment, the data sink may comprise n buffers, wherein n is the number of the plurality of DUs and wherein each of the n buffers matches the size of one of the plurality of DUs, wherein the transfer of at least part of the DPB to a data sink may include: copying the decoded DU in one of the n buffers of the data sink.

In an embodiment, the data sink may have a buffer that matches the size of a picture, wherein the transfer of at least part of the DPB to a data sink may include: copying the DU into the buffer of the data sink at a position according to the position of the DU in the picture.

In an embodiment, the signaling of the application may include: generating information associated with the decoding of the picture, the information including one or more of the following messages: a status message for signaling if the picture is fully decoded or not; the number of not yet decoded DUs; the location of the not yet decoded DUs in the picture.

In an embodiment, a DU may be a macroblock as defined in AVC, a coded tree unit CTU as defined in HEVC, a slice as defined in HEVC or VVC or a sub-picture as defined in VVC.

In an embodiment, the decoding may be based on a coding standard, preferably a block-based video coding standard, more preferably an AVC, HEVC, VP9, AV1, VVC coding standard or a coding standard based on of the AVC, HEVC, VP9, AV1, VVC coding standards.

In a further aspect, the invention may relate to a decoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: the processor of a decoding apparatus allocating memory for a decoded picture in a decoded picture buffer, DPB, the decoded picture comprising pixels representing video data; the processor receiving a bitstream comprising decoding units, DUs, and storing the DUs in a coded picture buffer, CPB, the DUs representing a coded picture that needs to be decoded into the decoded picture, each of the DUs representing a coded block of pixels;

the processor determining if, during decoding of the coded picture, at least one partial output can be performed, the at least one partial output including copying the one or more decoded DUs from the DPB to a data sink, while one or more DUs of the coded picture are not yet decoded and removed the CPB, the one or more decoded DUs representing a part of the decoded picture; and, the processor performing the at least one partial output if the processor determines that the at least one partial output can be performed, the performing including: marking the one or more decoded DUs stored in the DPB as being ready for partial output, the marking signaling the decoder apparatus not to remove the one or more decoded DUs from the DPB; copying the one or more marked decoded DUs from the DPB to the data sink without removing the one or more decoded DU from the DPB; and, optionally, signaling an application associated with the data sink that the partial output of the DPB has been performed.

The decoder apparatus may be configured to execute any of the method steps described above.

The invention may also relate to a computer program product comprising software code portions configured for, when run in the memory of a computer, executing the method steps according to any of process steps described above. In this application the following abbreviations and terms are used:

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 2 depicts an example of access unit comprising two decoding units.

FIG. 3 depicts an example of coding hierarchies requiring storage of multiple pictures in a decoding picture buffer.

DETAILED DESCRIPTION

Figure 1:
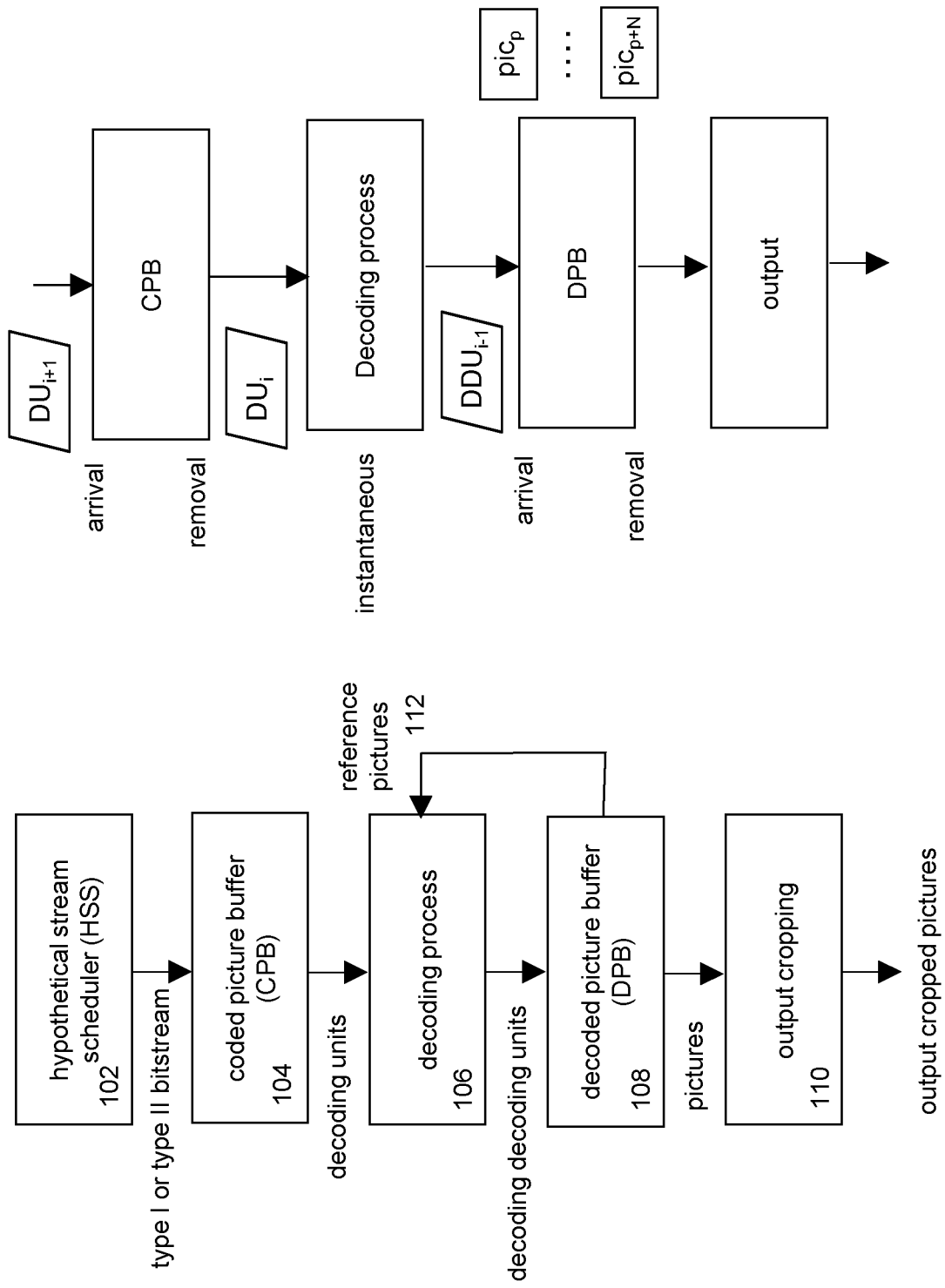
FIGS. 1A and 1B is a block diagram illustrating a buffer model for a hypothetical reference decoder (HRD).

FIGS. 1A and 1B is a block diagram illustrating a buffer model for a hypothetical reference decoder (HRD). as defined in the HEVC video standard (Annex C of the HEVC specification published as ISO/IEC 23008-2 and Recommendation ITU-T H.265). Most codecs use an HRD model for specifying constrains regarding the behavior of the buffers that are used during encoding and decoding. As shown in FIG. 1A, data associated with so-called decoding units (DUs) are input into a coded picture buffer CPB 102 according to a specified arrival schedule are delivered by the hypothetical stream scheduler (HSS) 100. A CPB is a first-in first-out buffer containing coded pictures for decoding. The data delivered by the HSS may be delivered as bitstream to the CPB. Each decoding unit is removed from the CPB and decoded by decoding process 104 (e.g., by video a decoder) at the CPB removal time of the decoding unit.

Each decoded picture produced by decoding process 104 is stored in the decoded picture buffer DPB 106. The DPB is a buffer holding decoded pictures for use in reference (e.g., inter-prediction), output reordering, output delay, and eventual display. A decoded picture may be removed from DPB when it is no longer needed for inter-prediction reference and no longer needed for output. In some examples, decoded pictures in DPB 106 may be cropped by an output cropping unit 108 before being displayed. Output cropping unit 108 may be part of video decoder 30 or may be part of external processor, e.g. a rendering engine, configured to further process the output of a video decoder. The behavior of the CPB and DPB is mathematically specified by the HRD an imposes constraints on different timing, buffer sizes and bit rates. Typical HRD parameters may include parameters such as: initial CPB removal delay, CPB size, bit rate, initial DPB output delay, and DPB size.

FIG. 1B depicts a timing model of the HRD, which defines the decoding of a coded video sequence (CVS) as a succession of steps starting at t=0 and ending when the last picture is decoded and output. The HRD is defined for decoding both access units (AUs), wherein each AU represents a full picture and decoding units (DUs), wherein each DU represents a part of a picture. This model considers several events each associated with a point in time during the decoding process:

the initial (first bits) and final (last bits) arrival of the (i+1)-th DU in the CPB, $t_{init\ arr}^{CPB}(DU_{i+1})$ and $t_{final\ arr}^{CPB}(DU_{i+1})$;
the removal of a DU from the CPB, $t_{rem}^{CPB}(DU_i)$;
the arrival of a decoded DU (DDU) in the DPB, $t_{arr}^{DPB}(DDU_{i-1})=t_{rem}^{CPB}(DU_i)$;
the output of a picture, $t_{out}^{DPB}(Pic_p)$.

Here the removal of a coded DU from the CPB and the arrival of a decoded DU at the DPB are the same as the decoding process of a DU is assumed to be instantaneously.

The input of the CPB is a bitstream comprising DUs wherein a DU can either be an AU or a subset of an AU. The CPB removal is based on an access unit (AU), i.e. a full coded picture, which includes set of network abstract layer (NAL) units and contains one coded picture. An example of a subset of an AU may be for example a slice of an AU, as shown in FIG. 2. This figure illustrates for example a set of NAL units including non-VCL NAL units (VSP, SPS and PPS) and two VCL NAL units forming an AU, wherein each VCL NAL units defines a DU in the form of a slice. This example thus defines a video frame 202 that is divided into two slices $204_{1,2}$, each occupying half of the frame and dividing it horizontally. Here, the term DU may be basic decoding unit defined in a video coding standard. Examples of a DU may include a macroblock known from AVC, a coding tree unit (CTU) known from HEVC and VVC or a sub-picture.

DUs defined as subset of AUs have been introduced in HEVC for low-delay applications where the decoding of a frame can be for instance broken down into decoding rows of blocks. DU may get assigned an additional decoding timestamp by the DU information SEI message. This timing information provides a timestamp for each DU, which can be used in addition to to the picture timing SEI message, which indicates the timing for coded picture buffer (CPB) removal and decoded picture buffer (DPB) removal of a whole access unit. This way, the decoding of a picture (a video frame) can already start while not all DUs of the picture (the video frame) have arrived in the CPB. DUs allow for example, low-delay operation modes such as parallel decoding of tiles. This way, delays introduced by the encoding, transmission and decoding process can be reduced.

The size of the DPB is dependent on the coding hierarchy as it must hold reference pictures that will be used by next frames to be decoded. Since it can happen that frames are decoded first but only presented later (e.g. as is the case in out-of-order encoding), the DPB may hold decoded frames for a short moment until all pictures are decoded and are output after which they can be removed from the DPB. For example, for the coding hierarchies depicted in FIGS. 3A and 3B, a DBP size of (at least) three pictures is needed. For example, pictures P1 and P2 in FIG. 3A both need to be stored in the DPB when P3 is being decoded since they are both output after P3. The DPB therefore needs to be capable to store P1, P2, and P3 simultaneously. Similarly, in FIG. 3B each picture uses two reference pictures so the DPB needs to be large enough to store three pictures simultaneously. The referencing structure in FIG. 3B is an example of a so-called low-delay B structure, in which bi-prediction is extensively used without any out-of-order output.

In the HEVC HRD model, decoding or CPB removal is based on an access unit (AU), i.e. a full coded picture, wherein the picture decoding is assumed to be instantaneous. An AU defines a set of network abstract layer (NAL) units comprising one coded picture. A decoder may follow signaled decoding times (e.g., as defined in so-called picture timing supplemental enhancement information (SEI) messages) that are generated by the video encoder to start decoding of AUs. The HRD model defines syntax elements that can be used to control the timing of the decoding and the output.

Thus, as described above, the CPB may operate at either the AU level (i.e., picture level) or sub-picture level (i.e., less than an entire picture). The operation may depend on whether sub-picture level CPB operation is preferred by a decoder (which may be specified by an external means not specified in the HEVC standard) and whether sub-picture CPB parameters are present in the bitstream or provided to a decoder via an external means not specified in the HEVC standard). When both conditions are true, the CPB may operate at a sub-picture level so that each DU is defined as a subset of an AU. Parameters and/or flags in the bitstream may signal the decoder in which mode it should operate. For example, a DU may be equal to an AU if a syntax element SubPicCpbFlag is equal to 0, the DU is a subset of an AU otherwise. In more general, the encoder or an application may insert HRD parameters in the bitstream to control the decoding process on the basis of the HRD model.

For example, in practical video applications, a decoder may follow signaled decoding times (e.g., as defined in so-called picture timing supplemental enhancement information (SEI) messages) that are generated by the video encoder to start decoding of AUs, then the earliest possible time to output a particular decoded picture is equal to the decoding time of that particular picture. i.e. the time when a picture starts to be decoded, plus the time needed for decoding that particular picture (which in the HRD model is instantaneously).

Video applications that may make use of a video codec not only include streaming and broadcast/multicast applications, but also virtual reality (VR) and gaming applications. The latter being examples of video applications that consume so-called omnidirectional content. When encoding omnidirectional content, special projections such as a cubemap projection, are used to map pixels on a sphere on the 2D plane of a video picture, Such projected video frames contains different parts of a spherical video wherein the content that is rendered is determined by the current user's viewport. At each time instance, some parts of the omnidirectional video are covered by the user's viewport while other parts are not. As a result, it is advantageous for an application to retrieve updated pixels in the user's viewport from the next frame as soon as possible to be able to refresh the presented pictures. Hence, for these applications a low-delay rendering pipeline is desired in which fast access to decoded pixels in the DPB is desired.

Current HRD models however do not allow an application to access to the decoded picture buffer before the entire picture is decoded. The HRD model only allows the output of a picture from the DPB once the picture has been fully decoded. DUs enable decoding before all DUs are received by the CPB but the output is always when the picture is completely decoded. However, nowadays many applications pack different video objects inside the same picture while these different objects do not necessarily have to be displayed together nor at the same time. One advantage of this packing into the same frames is that the different objects are time locked (synchronised) by design, by belonging to a single frame corresponding to a certain decoding timestamp, hence referring to point in time of the media timeline. But when these different video objects are packed together in the same picture, they become available to the application all at the same time as a single output picture after decoding. That is, the application has no fine access to each of these objects but can only access them when all the objects for a certain picture are decoded.

This can be problematic in a scenario where a decoder cannot decode the full picture on time, but is only capable of decoding part of the frame. Such situation could happen for example when the decoder/CPU/GPU overheats and performance decreases, when due to network issues a part of the picture has not arrived on time, when a CPB error occurs in feeding the decoder with DUs, when an error in transmission/bitstream manipulation makes one or multiple DUs undecodable and/or when a glitch occurs in the decoding process itself.

Hereunder, decoding processes are described that allow fast rendering or post-processing of video data that are outputted by a decoder apparatus. An example of such decoding process is described with reference FIG. 4. This figure depicts a flow diagram of a decoding process according to an embodiment of the invention. As shown in this figure, the process may start with a decoder allocating memory for a decoded picture in a decoded picture buffer (DPB) of the decoder (step 402). A decoded picture may comprise pixels representing video data. The method may further comprise the decoder receiving a bitstream comprising decoding units (DUs) and storing the DUs in a coded picture buffer (CPB) of the decoder (step 404). Here, the DUs may represent a coded picture that needs to be decoded into the decoded picture. Further, each of the DUs may represent a coded block of pixels.

In step 406, the decoder may determine if, during decoding of the coded picture, at least one partial output can be performed. Here, a partial output may include copying the one or more decoded DUs from the DPB to a data sink, while one or more DUs of the coded picture are not yet decoded and removed the CPB. The one or more decoded DUs may represent a part of the decoded picture. The decoder may perform the at least one partial output if the processor determines that the at least one partial output can be performed (step 408). The performing of the partial output may include marking the one or more decoded DUs stored in the DPB as being ready for partial output. The marking may signal the decoder not to remove the one or more decoded DUs from the DPB.

A further step may include copying the one or more marked decoded DUs from the DPB to the data sink without removing the one or more decoded DU from the DPB.

In an embodiment (not shown), the decoder may signal an application associated with the data sink that the partial output of the DPB has been performed. In a further embodiment, if all DUs of the coded picture are decoded, the decoded picture may be marked as available for output. In that case, the full decoded picture in the DPB may be copied into a data sink and the picture may be removed from the DPB unless it is needed as a reference picture for interprediction.

The main insight of the embodiments in this disclosure in case each picture of a video contain multiple DUs, the decoder enables an output of a partial reconstruction of the full picture (a partial output of the decoded picture) before the entire picture is decoded, i.e. before all DUs of the picture are removed from the CPB. The embodiments described in this disclosure allow an application, e.g. VR application or an image post-processing application, to access a data sink comprising part of a picture stored in the DPB before the picture is entirely decoded. The invention thus enables an application to access a part of the decoded picture while other part of the picture, i.e. the DUs have arrived in the CPB or have not been removed from the CPB. This way, the application, e.g. a rendering process or a video processing step, may already start on the basis of part of the picture, while the full picture is not fully decoded.

Figure 5:
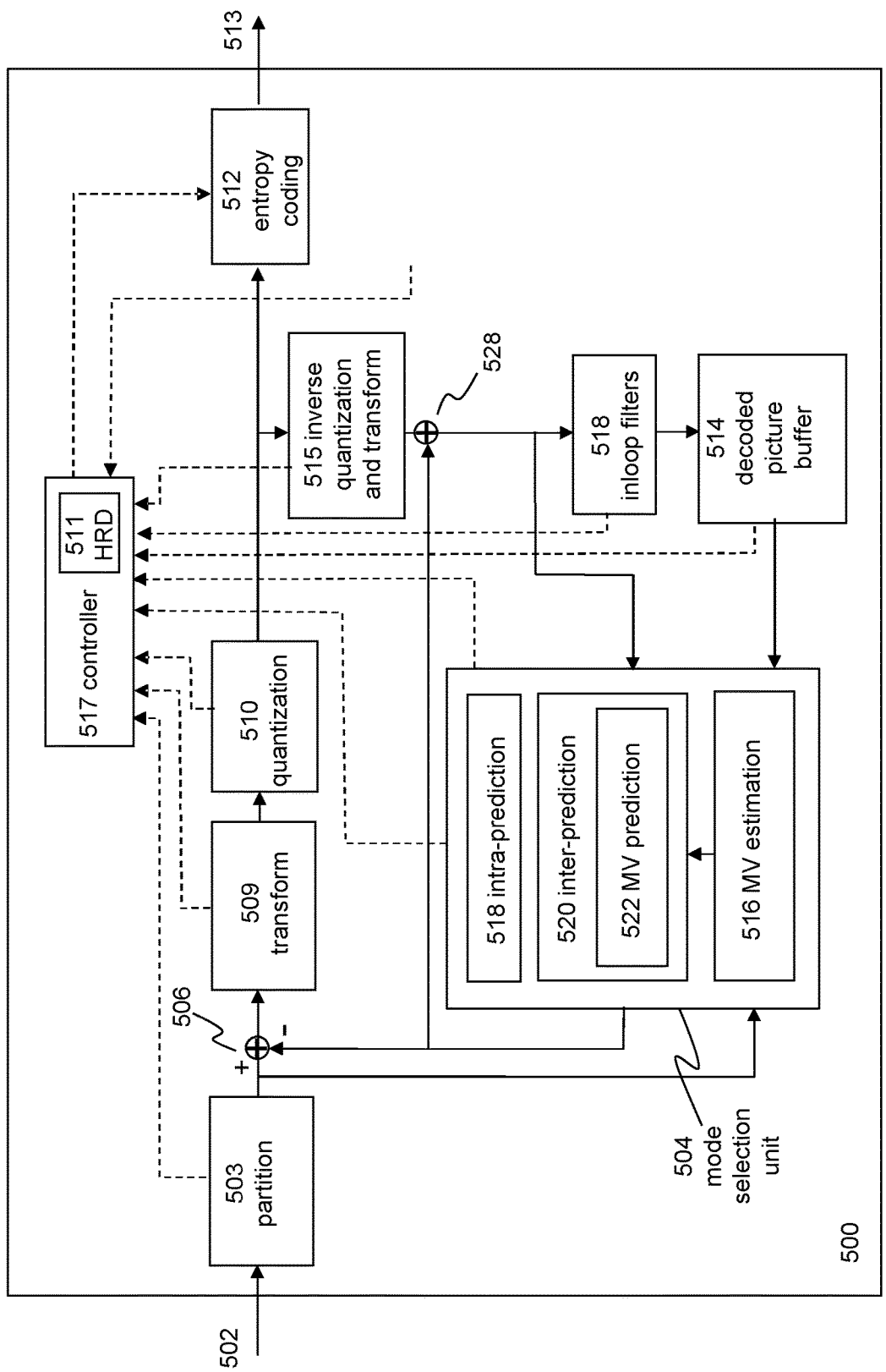
FIG. 5 depicts an encoder apparatus for generating a bitstream that is suitable for partial output.

FIG. 5 is a block diagram illustrating a video encoder apparatus 500 that is configured to provide the partial output functionality as described with reference to the embodiments in this application. Video encoder apparatus 500 may perform intra- and inter-coding of video blocks within video frames or parts thereof, e.g. video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The video encoder apparatus may receive video data 502 to be encoded. In the example of FIG. 5, video encoder apparatus 500 may include partition unit 503, a mode select unit 504, summer 506, transform unit 508, quantization unit 510, entropy encoding unit 512, and decoded picture buffer 514. Mode select unit 504, in turn, may comprise a motion estimation unit 516, inter-prediction unit 520, and intra prediction unit 520. Inter-prediction unit may comprise a motion vector prediction unit 522, which may be configured to generate a list of motion vector predictor candidates according to the embodiments in this application. For video block reconstruction, the video encoder apparatus 500 may also include inverse quantization and transform unit 515, and summer 528. An in-loop filter, such as a deblocking filter 518, may also be included to filter-out artefacts from the reconstructed video frames. Additional loop filters (in loop or post loop) may also be used in addition to the deblocking filter. In case during the decoding of a coded picture into a decoded picture an inloop-filter is used to filter out artefacts, then metadata, e.g. a flag, may be inserted into the bitstream for signalling a decoder that it should use the in-loop filter during decoding. For example, in HEVC, the information whether the in-loop filter(s) are enabled may be inserted in the SPS or PPS messages, depending on whether the in-loop filtering is enabled or disabled on a per-picture or per-picture set basis.

The mode select unit 504 may select one of the coding modes (e.g. intra-prediction or inter-prediction modes based on error results of an optimization function such as a rate-distortion optimization (RDO) function), and provides the resulting intra- or inter-coded block to summer 506 to generate a block of residual video data (a residual block) to summer 528 to reconstruct the encoded block for use as a reference picture. During the encoding process, video encoder 500 may receive a picture or slice to be coded. The picture or slice may be partitioned into multiple video blocks. An inter-prediction unit 520 in the mode selection unit 504 may perform inter-prediction coding of the received video block relative to one or more blocks in one or more reference pictures to provide temporal compression. Alternatively, an intra-prediction unit 518 in the mode selection unit may perform intra-prediction coding of the received video block relative to one or more neighbouring blocks in the same picture or slice as the block to be coded to provide spatial compression. Video encoder may perform multiple coding passes, e.g., to select an appropriate coding mode for each block of video data.

The partition unit 503 may further partition video blocks into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). The partitioning unit may further produce a quadtree data structure indicative of partitioning of an LCU into sub-CUs. Leaf-node CUs of the quadtree may include one or more PUs and one or more TUs.

The motion vector estimation unit 516 may execute a process of determining motion vectors for video blocks. A motion vector, for example, may indicate a displacement Dx,Dy of a prediction block (a prediction unit or PU) of a video block within a reference picture (or other coded unit) relative to the current block being coded within the current picture (or other coded unit). The motion estimation unit may compute a motion vector by comparing the position of the video block to the position of a prediction block of a reference picture that approximates the pixel values of the video block. Accordingly, in general, data for a motion vector may include a reference picture list (e.g. an (indexed) list of already decoded pictures (video frames) stored in the memory of the encoder apparatus), an index into the reference picture list, a horizontal (x) component and a vertical (y) component of the motion vector. The reference picture may be selected from one or more reference picture lists, e.g. a first reference picture list, a second reference picture list, or a combined reference picture list, each of which identify one or more reference pictures stored in reference picture memory 514.

The MV motion estimation unit 516 may generate and send a motion vector that identifies the prediction block of the reference picture to entropy encoding unit 512 and the inter-prediction unit 520. That is, motion estimation unit 516 may generate and send motion vector data that identifies a reference picture list containing the prediction block, an index into the reference picture list identifying the picture of the prediction block, and a horizontal and vertical component to locate the prediction block within the identified picture.

Instead of sending the actual motion vector, a motion vector prediction unit 522 may predict the motion vector to further reduce the amount of data needed to communicate the motion vector. In that case, rather than encoding and communicating the motion vector itself, the motion vector prediction unit 522 may generate a motion vector difference (MVD) relative to a known motion vector, a motion vector predictor MVP. The MVP may be used with the MVD to define the current motion vector. In general, to be a valid MVP, the motion vector being used for prediction points to the same reference picture as the motion vector currently being coded.

The motion vector prediction unit 522 may be configured to build a MVP candidate list that may include motion vectors associated with a plurality of already encoded blocks in spatial and/or temporal directions as candidates for a MVP. In an embodiment, the plurality of blocks may include blocks in the current video frame that are already decoded and/or blocks in one or more references frames, which are stored in the memory of the decoder apparatus. In an embodiment, the plurality of blocks may include neighbouring blocks, i.e. blocks neighbouring the current block in spatial and/or temporal directions, as candidates for a MVP. A neighbouring block may include a block directly neighbouring the current block or a block that is in the neighbourhood of the current block, e.g. within a few blocks distance.

When multiple MVP candidates are available (from multiple candidate blocks), MV prediction unit 522 may determine an MVP for a current block according to predetermined selection criteria. For example, MV prediction unit 522 may select the most accurate predictor from the candidate list based on analysis of encoding rate and distortion (e.g., using a rate-distortion cost analysis or other coding efficiency analysis). Other methods of selecting a motion vector predictor are also possible. Upon selecting an MVP, MV prediction unit may determine a MVP index, which may be used to inform a decoder apparatus where to locate the MVP in a reference picture list comprising MVP candidate blocks. MV prediction unit 522 may also determine the MVD between the current block and the selected MVP. The MVP index and MVD may be used to reconstruct the motion vector of a current block. Typically, the partition unit and mode selection unit (including the intra- and inter-prediction unit and the motion vector predictor unit) and the motion vector estimation unit may be highly integrated. These units are illustrated separately in the figures for conceptual purposes.

A residual video block may be formed by an adder 506 subtracting a predicted video block (as identified by a motion vector) received from mode select unit 504 from the original video block being coded. The transform processing unit 509 may be used to apply a transform, such as a discrete cosine transform (DCT) or a conceptually similar transform, to the residual video block to form a block of residual transform coefficient values. Transforms that are conceptually similar to DCT may include for example wavelet transforms, integer transforms, sub-band transforms, etc. The transform processing unit 509 applies the transform to the residual block, producing a transformed residual block. In an embodiment, the transformed residual block may comprise a block of residual transform coefficients. The transform may convert the residual information from a pixel value domain to a transform domain, such as a frequency domain. Transform processing unit 509 may send the resulting transform coefficients to a quantization unit 510, which quantizes the transform coefficients to further reduce bit rate.

A controller 517 may provide syntax elements (metadata) of the encoding process, such as inter-mode indicators, intra-mode indicators, partition information, and syntax information, to entropy coding unit 512. Here the syntax elements may include information for signalling (selected) motion vector predictors (for example an indication, e.g. an index in an indexed list, of the MVP candidate selected by the encoder), motion vector differences and metadata associated with the motion vector prediction process. The controller may control the encoding process based on an HRD model 511 which may define syntax elements, e.g. a flag that partial output is possible and/or picture timing SEI messages for timing of the partial output, that can be used for the generation of a bitstream 513 that is suitable for partial output. For example, during the encoding process, the encoder may insert parameters and/or messages, such as SEI messages, into the bitstream that enable a decoder apparatus to partially output decoded DUs that are stored in the DPB. Examples of such messages are described hereunder in more detail.

The entropy coding unit 512 entropy may be configured to encode the quantized transform coefficients and the syntax elements into bitstream 513. For example, entropy coding unit may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighbouring blocks. Following the entropy coding by entropy coding unit, the encoded bitstream may be transmitted to another device (e.g., a video decoder) or stored for later transmission or retrieval.

The inverse quantization and inverse transform unit 515 may be configured to apply an inverse quantization and inverse transformation, respectively, to reconstruct the residual block in the pixel domain, e.g., for later use as a reference block. Inter-prediction unit 520 may calculate a reference block by adding the residual block to a prediction block of one of the reference pictures that are stored in the decoded picture buffer 514. Inter-prediction unit 520 may also apply one or more interpolation filters to the reconstructed residual block to calculate sub-integer pixel values for use in motion estimation. The reconstructed residual block may be added to the motion prediction block produced by the inter-prediction unit 520 to produce a reconstructed video block for storage in the reference picture memory 514. The reconstructed video block may be used by motion vector estimation unit 516 and inter-prediction unit 520 as a reference block to inter-coding a block in a subsequent picture.

The encoder apparatus may perform a known rate-distortion optimisation (RDO) process in order to find the best coding parameters for coding blocks in a picture. Here, the best coding parameters (including mode decision (intra-prediction or inter-prediction); intra prediction mode estimation; motion estimation; and quantization) refer to the set of parameters that provide the best trade-off between a number of bits used for encoding a block versus the distortion that is introduced by using the number of bits for encoding.

The term rate-distortion optimization is sometimes also referred to as RD optimization or simply "RDO". RDO schemes that are suitable for AVC and HEVC type coding standards are known as such, see for example, Sze et al. "*High efficiency video coding (HEVC)*." Integrated Circuit and Systems, Algorithms and Architectures. Springer (2014): 1-375; Section: 9.2.7 RD Optimization. RDO can be implemented in many ways. In one well-known implementation, the RDO problem can be expressed as a minimization of a Lagrangian cost function J with respect to a Lagrangian multiplier:

$$\lambda:: \min_{(coding\ parameters)} J = (D + \lambda * R).$$

Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In the context of HEVC, the rate-distortion cost may require that the encoder apparatus computes a predicted video block using each or at least part of the available prediction modes, i.e. one or more intra-prediction modes and/or one or more inter-prediction modes. The encoder apparatus may then determine a difference video signal between each of the predicted blocks and the current block (here the difference signal may include a residual video block) and transforms each residual video block of the determined residual video blocks from the spatial domain to the frequency domain into a transformed residual block. Next, the encoder apparatus may quantize each of the transformed residual blocks to generate corresponding encoded video blocks. The encoder apparatus may decode the encoded video blocks and compare each of the decoded video blocks with the current block to determine a distortion metric D. Moreover, the rate-distortion analysis may involve computing the rate R for each encoded video block associated with of one of the prediction modes, wherein the rate R includes a number of bits used to signal an encoded video block. The thus determined RD costs, the distortion D and the rate R of the encoded blocks for each of the prediction modes, are then used to select an encoded video block that provides the best trade-off between the number of bits used for encoding the block versus the distortion that is introduced by using the number of bits for encoding.

Figure 6:
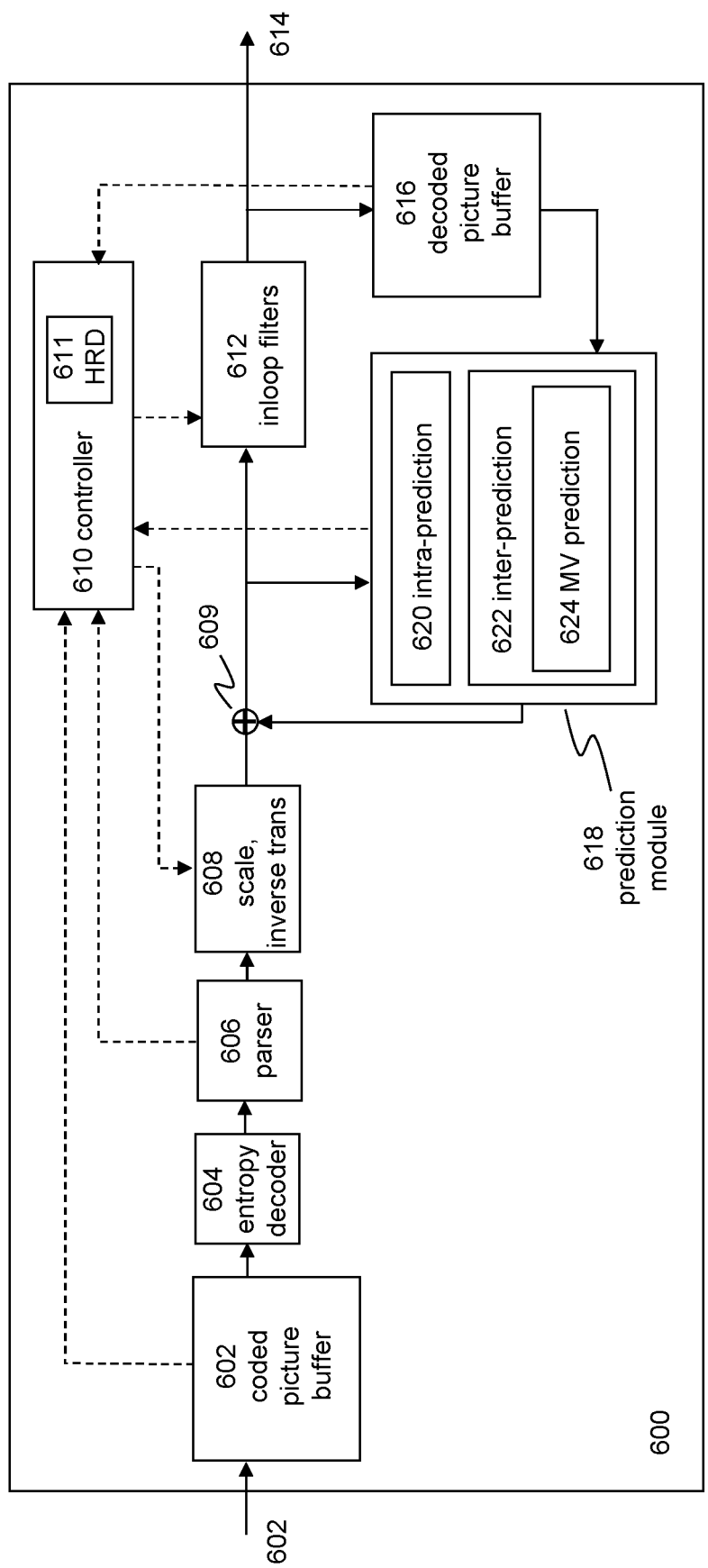
FIG. 6 depicts a decoder apparatus configured to perform partial output according to an embodiment of the invention.

FIG. 6 is a block diagram illustrating a video decoder apparatus 600 comprising a motion vector prediction unit according to an embodiment of the invention. The decoder apparatus, or in short, decoder apparatus, may be configured to decode a bitstream comprising encoded video data as generated by a video encoder apparatus as described with reference to FIG. 5.

In the example of FIG. 6, video decoder apparatus 600 may include entropy decoding unit 604, parser 606, prediction unit 618, inverse quantization and inverse transformation unit 608, summer 609, controller 610 and a decoded picture buffer 616 for storing decoded information, including reference pictures that are used in the decoding process. Here, prediction unit 518 may include an inter-prediction unit 622 and intra-prediction unit 620. Further, the inter-prediction unit may include a motion vector prediction unit 624.

Similar to the motion vector predictor unit of the encoder apparatus of FIG. 5, the motion vector prediction unit of the decoder may be configured to build a MVP candidate list that may include motion vectors of a plurality of blocks, including blocks, such as neighbouring blocks, in the current video frame that are already decoded and/or blocks in one or more references frames, which are stored in the decoded picture buffer.

Decoder apparatus 600 may be configured to receive an encoded video bitstream 602 that comprises encoded decoding units, e.g. encoded video blocks and associated syntax elements from a video encoder. Entropy decoding unit 604 decodes the bitstream to generate transformed decoded residual blocks (e.g. quantized coefficients associated with residual blocks), motion vector differences, and syntax elements (metadata) for enabling the video decoder to decode the bitstream.

Parser unit 606 forwards the motion vector differences and associated syntax elements to prediction unit 618. The syntax elements may be received at video slice level and/or video block level. For example, by way of background, video decoder 600 may receive compressed video data that has been compressed for transmission via a network into so-called network abstraction layer (NAL) units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

When video blocks of a video frame are intra-coded (I), intra-prediction unit 620 of prediction unit 618 may generate prediction data for a video block of the current video slice based on a signalled intra-prediction mode and data from previously decoded blocks of the current picture. When video blocks of a video frame are inter-coded (e.g. B or P), inter-prediction unit 622 of prediction unit 618 may produces prediction blocks for a video block of the current video slice based on motion vector differences and other syntax elements received from entropy decoding unit 604. The prediction blocks may be produced from one or more of the reference pictures within one or more of the reference picture lists stored in the memory of the video decoder. The video decoder may construct the reference picture lists, using default construction techniques based on reference pictures stored in reference picture memory 616.

Inter-prediction unit 620 may determine prediction information for a video block of the current video slice by parsing the motion vector differences and other syntax elements and using the prediction information to produce prediction blocks for the current video block being decoded. For example, inter-prediction unit 620 uses some of the received syntax elements to determine a prediction mode (e.g., intra- or inter-prediction) which was used to code the video blocks of the video slice, an inter-prediction slice type (e.g., B slice or a P slice), construction information for one or more of the reference picture lists for the slice, motion vector predictors for each inter-encoded video block of the slice, inter-prediction status for each inter-coded video block of the slice, and other information to decode the video blocks in the current video slice. In some examples, inter-prediction unit 620 may receive certain motion information from motion vector prediction unit 624.

The decoder apparatus may retrieve a motion vector difference MVD and an associated encoded block representing a current block that needs to be decoded. In order to determine a motion vector based on the MVD, the motion vector prediction unit 624 may determine a candidate list of motion vector predictor candidates associated with a current block. The motion vector predictor unit 624 may be configured to build a list of motion vector predictors in the same way as done by the motion vector predictor unit in the encoder.

The motion vector prediction algorithm may evaluate motion vector predictor candidates which are associated with blocks in the current frame or a reference frame that have a predetermined position (typically neighbouring) relative to the position of the current block. These relative positions are known to the encoder and the decoder apparatus. Thereafter, the motion vector prediction unit may select a motion vector predictor MVP from the list of motion vector prediction candidates based on the indication of the selected motion vector predictor candidate which was transmitted in the bitstream to decoder. Based on the MVP and the MVD the inter-prediction unit may determine a prediction block for the current block.

Inverse quantization and inverse transform unit 608 may inverse quantize, i.e., de-quantizes, the quantized transform coefficients provided in the bitstream and decoded by entropy decoding unit. The inverse quantization process may include the use of a quantization parameter calculated by video encoder for each video block in the video slice to determine a degree of quantization and, likewise, a degree of inverse quantization to be applied. It may further apply an inverse transform, e.g., an inverse DCT, an inverse integer transform, or a conceptually similar inverse transform process, to the transform coefficients in order to produce residual blocks in the pixel domain.

After the inter-prediction unit 620 has generated the prediction block for the current video block, the video decoder may form a decoded video block by summing a residual block with the corresponding prediction block. The adder 609 represents the component or components that perform this summation operation. If desired, a deblocking filter may also be applied to filter the decoded blocks to remove blocking artefacts. Other loop filters (either in the coding loop or after the coding loop) may also be used to smooth pixel transitions, or otherwise improve the video quality. The decoded video blocks in a given picture are then stored in a coded picture buffer 616, which stores reference pictures which may be used for subsequent coding of further current blocks. The coded picture buffer 616 may also store decoded video for later presentation on a display device.

The controller may control the decoding process based on an HRD model 611 which may define syntax elements, e.g. a flag that partial output is possible and/or picture timing SEI messages for timing of the partial output, that can be used for processing coded DUs in the bitstream 602 wherein the processing includes performing at least one partial output during the decoding of a coded picture as described with reference to FIG. 4. For example, during the decoding process, the decoder may determine whether the bitstream is suitable for partial output as described with reference to the embodiments in the application. To that end, the decoder, or in particular the controller of the decoding process, may be configured to detect certain SEI messages in the bitstream which signal the decoder apparatus that partial output is possible. Alternatively, the decoder may be configured to determine if partial picture output is possible by examining if the in-loop filtering for pictures is disabled. Examples of such messages are described hereunder in more detail.

Figure 4:
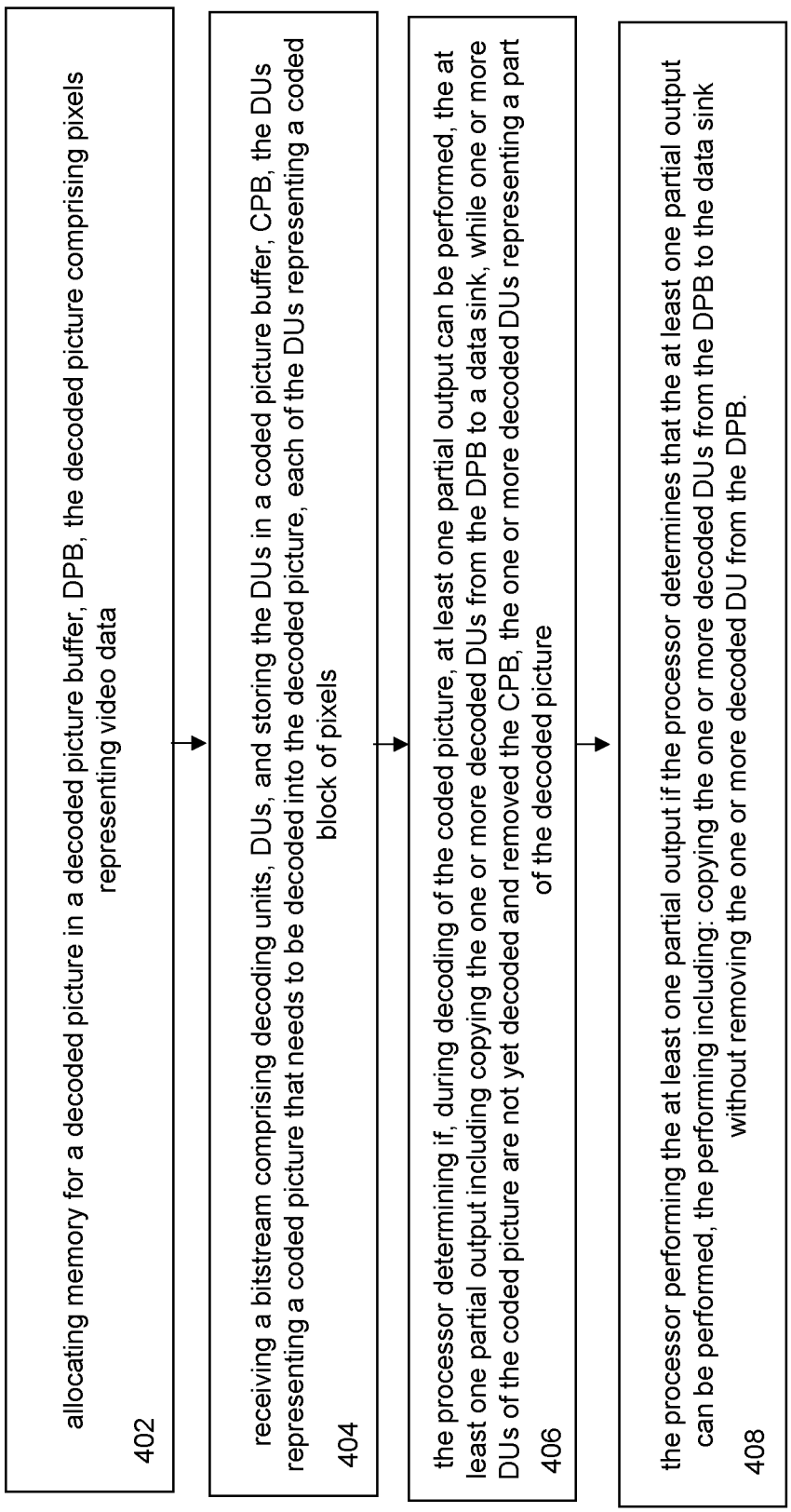
FIG. 4 depicts a flow diagram of a decoding process according to an embodiment of the invention

Hereunder, the process of partial picture output as described with reference to FIG. 4 is described in more detail. The process may start with the allocation of memory for a decoded picture in a decoded picture buffer. Thus, in case a new coded picture needs to be decoded space can be allocated in the DPB. This allocated memory space is configured to receive, and store decoded DUs. The decoded DU eventually will be outputted, wherein the outputting may include copying the pixel values into a data sink, which may be associated with an application. The stored pixel values can also be used as a reference frame in a future decoding step.

Further, the partial output process includes receiving a bitstream comprising DUs and storing the DUs in a CPB. Once DUs of a coded picture are stored in the CPB, the decoder may start the decoding process. Because the decoding process in HEVC is considered instantaneous, as soon as a DU is removed from the CPB, it is considered to be decoded and placed in the allocated memory of the DPB. Decoded samples (pixel values) are copied in the frame at the location corresponding the DU. The location of the DU can be derived from the position of the DU in the frame as signalled in the bitstream, possible using tiles or slice segment address in picture unit.

As the decoding process is considered instantaneous in the HRD model, no specific information on the time that is needed for decoding is needed. The only timing information that is relevant includes the time for removal from the CPB (for decoding) and from the DPB (for discarding). There is also timing information on the timing for output of a decoded picture from the DPB into a data sink. This timing information provides the time at which a decoded picture in the DPB can be accessed by an application via the data sink.

The partial output process further includes determining if, during decoding of the coded picture, at least one partial output can be performed. If the in-loop filtering is enabled, neighbouring DUs of a picture are required before filtering can take place. Hence, in that case, partial picture output is not possible. Thus, in order to determine if partial picture output is possible, the decoder needs to know if in-loop filtering is set for a particular picture or for a number of pictures. In an embodiment, the decoder may examine whether the in-loop filtering is enabled or not. For example, in HEVC, the information of whether the in-loop filter(s) are enabled can be contained in SPS or PPS messages, depending on whether the in-loop is enabled/disabled on a per-picture or per-picture set basis respectively. This information can be used to identify if partial picture output is applicable. If in-loop filters are enabled, and slices are present, individual information about the respective filter per slice is contained in the Slice Segment Header.

Alternatively, the bitstream may include an indication, e.g. a flag, that partial picture output can be used. Such signalling is useful for a client application for initializing the processing pipeline, setting the required buffers etc. This signalling can be implemented using SEI messages, which are non-VCL units. Alternatively, the signalling can be implemented in the SPS or the PPS of the VCL-NAL units comprising the coded DUs of a picture (depending on whether partial picture output is available for a single or multiple pictures). In case of such indication, the decoder may assume that the in-loop filtering is disabled.

Hereunder, examples of messages for a decoder for signalling partial picture output before the fully decoded picture is output. In an embodiment, messages for signalling partial picture output include decoding SEI messages (a type of NAL units), e.g. a so-called picture timing SEI messages for signalling decoding information of a picture to a decoder, as known from HEVC and VVC. Other decoding SEI messages, such as a decoding unit information SEI message, may also be used to convey relevant decoding information to the decoder as well. Other relevant SEI message types are the buffering period SEI messages for example, that has buffering parameters like the cpb_delay_offset. More generally, signalling messages may be implemented based on syntax elements of other standards, e.g. HEVC, AV1, VP10, etc.

According to a conventional HRD model, once a coded picture is removed from the CPB, the associated decoded picture in the DPB may become available for output after a predetermined time delay. In HEVC and VVC this time delay is referred to as the picture dpb output time delay. The picture dpb output time delay may be determined by the decoder for each picture. Its value may dependent on multiple decoder parameters, including (at east) the two following time instances:

1. a CPB removal time, i.e. the time instance at which a coded picture is removed from the CPB (because it is fully decoded into a decoded picture and stored in the DPB)
2. a DPB output time, a time instance at which a decoded picture (as stored in the DPB) is output.

In VVC, the dpb output time delay of a picture is governed by the pict_dpb_output_delay syntax element. After this delay, a decoded picture that is stored in the DPB is outputted. Typically, after output the picture is removed from the DPB, unless it is kept for future use (e.g. for reference used in the decoding process of other frames).

The embodiments that are described hereunder with reference to table 1-3 below, introduce a new syntax element, a dpb partial output time delay parameter, which signals an HRD compliant decoder that after each time period (defined by the interval) a partial picture output is performed. This way, during the decoding process, decoded information in the DPB becomes available for output before the picture dpb output delay is finished.

Hence, the invention no longer assumes that the decoding process is instantaneously, but requires a certain amount of time. During this decoding time, decoded information in the DPB may be made available for output so that it can already be used by an application. In practice this means that at one or more time instances (defined by the DPB partial output interval), the decoded information in the DPB that is processed up to the moment of each of these time instances is transferred to a data sink so that it already can be accessed by an application, before the end of the picture dpb output delay. Thus, during decoding of a coded picture, multiple transfers of decoded information from the DPB to a data sink may take place before the end of the picture dpb output delay.

Note that it is not possible for an application to access decoded information in the DPB (which is part of the decoder). It is assumed that the output process of the HRD model is governed by copying (blocks of) decoded information from the DPB to a data sink outside the decoder.

Here, a data sink is a general term for any storage or buffering means that is capable of receiving data from the decoder. Examples of a data sink include an external buffer, e.g. a rendering buffer of an VR application, a socket, a memory, a hard disc, etc.

The granularity at which decoded information in the data sink becomes available by the partial picture output scheme may depend on the type of application. The smallest unit that can be made available is a DU, i.e. a basic processing unit at which a decoder process takes place, e.g., output of one or more marco-blocks in AVC or one or more coding tree units (CTUs) in HEVC or VVC. Alternatively, sub-picture output of the DPB can be realized at higher level picture partitioning schemes, such a decoding unit (DU) or a sub-picture as defined in HEVC and VVC respectively.

Depending on the application, the signalling of the sub-picture output may be based on SEI messages (or equivalent messages thereof) that are inserted in the bitstream (in-band) to the decoder. Alternatively, it is also possible to convey these messages in an out-of-band channel to the decoder.

Table 1 depicts part of a Picture Timing SEI message according to an embodiment of the invention. In this particular embodiment, sub-picture output is organized at picture-level (and not at decoding unit (DU) or sub-picture level as known from HEVC and VVC).

TABLE 1

Picture Timing SEI message syntax extract (per-picture version)

|  | Descriptor |
|---|---|
| pic_timing( payloadSize ) { |  |
| ... |  |
|    au_cpb_removal_delay_minus1 | u(v) |
|    pic_dpb_output_delay | u(v) |
|    if ( pic_partial_output_interval_present_flag ) { |  |
|       pic_dpb_partial_output_interval | u(v) |
|    } |  |
|    if( sub_pic_hrd_params_present_flag ) { |  |
|       pic_dpb_output_du_delay | u(v) |
|    } |  |
|    if( bp_decoding_unit_hrd_params_present_flag && decoding_unit_cpb_params_in_pic_timing_sei_flag ) { |  |
|       num_decoding_units_minus1 | ue(v) |
| ... |  |
| ... |  |
| } |  |

As shown in table 1, the message comprises an au cpb removal time delay and a pic dpb output delay which may be used by the decoder to compute a time at which a decoded picture in the DPB is outputted.

The table further includes a sub-picture output flag, which is referred to as the pic_partial_output_interval_present_flag. This binary flag may be used to signal whether the sub-picture output functionality is available.

If the flag is true, an interval as defined by the pic_dpb_partial_output_interval syntax element is set to a particular value. This parameter defines an output interval ed for the sub-picture output of the DPB. The interval may be defined in clock ticks. Further, the interval may be selected to be substantially smaller than the picture dpb output delay. This way, the sub-picture output scheme allows multiple sub-picture outputs of the DPB during decoding of a picture, i.e. multiple outputs of the DPB within the period defined by the picture dpb output delay syntax element.

In an embodiment, a partial picture output of the DPB may have a picture size format, i.e. at the end of each pic_dpb_partial_output_interval a copy of the content of the DPB is transferred to the data sink.

Table 2 depicts part of a Picture Timing SEI message according to another embodiment of the invention.

TABLE 2

Picture Timing SEI message syntax extract (per-DU version 1)

|  | Descriptor |
|---|---|
| pic_timing( payloadSize ) { |  |
| ... |  |
|    au_cpb_removal_delay_minus1 | u(v) |
|    pic_dpb_output_delay | u(v) |
|    if( sub_pic_hrd_params_present_flag ) { |  |
|       pic_dpb_output_du_delay | u(v) |
|       pic_dpb_partial_output_interval | u(v) |
|    } |  |
|    if( bp_decoding_unit_hrd_params_present_flag && decoding_unit_cpb_params_in_pic_timing_sei_flag ) { |  |
|       num_decoding_units_minus1 | ue(v) |
| ... |  |
| ... |  |
| } |  |

As shown in table 2, the message comprises an au cpb removal delay and a pic dpb output delay which are used by the decoder to determine when a decoded picture at sub-picture level as known from HEVC and VVC respectively.

Table 2 further includes a sub_pic_hrd_params_present_flag flag. If this flag is true, the processing of the picture takes place at sub-picture level as defined e.g. in HEVC and VVC, wherein the pic_dpb_output_du_delay value is set. This delay value may be used by the decoder to compute the picture dpb output delay, i.e. the time after removal of the last decoding unit in an access unit from the CPB before the decoded picture is output from the DPB. The message further includes a pic_dpb_partial_output_interval syntax element for signalling the decoder the interval that is used for the sub-picture output of the DPB. The interval may be defined in clock ticks and allows multiple sub-picture outputs during the decoding of the picture in a similar way as described with reference to table 1 above.

In this embodiment, the partical picture output of the DPB may have a picture-size format, i.e. at every partial picture output, a copy of the whole DPB is transferred to the output sink.

Table 3 depicts part of a Picture Timing SEI message according to yet another embodiment of the invention.

TABLE 3

Picture Timing SEI message syntax extract (per-DU version 2)

|  | Descriptor |
|---|---|
| pic_timing( payloadSize ) { |  |
| ... |  |
|    au_cpb_removal_delay_minus1 | u(v) |
|    pic_dpb_output_delay | u(v) |
|    if( sub_pic_hrd_params_present_flag ) { |  |
|       pic_dpb_output_du_delay | u(v) |

TABLE 3-continued

Picture Timing SEI message syntax extract (per-DU version 2)

| | Descriptor |
|---|---|
| pic_dpb_partial_output_du_interval | u(v) |
| } | |
| if( bp_decoding_unit_hrd_params_present_flag && decoding_unit_cpb_params_in_pic_timing_sei_flag ) { | |
| num_decoding_units_minus1 | ue(v) |
| ... | |
| ... | |
| } | |

Also in this embodiment, partial picture output is organized at decoding unit (DU) or sub-picture level as known from HEVC and VVC respectively. This mode is set if the SubPicHrdFlag is equal to 1. Further, the message includes the same syntax elements to signal that sub-picture DPB is available, however in this case instead of a pic_dpb_partial_output_interval syntax element, a pic_dpb_partial_output_du_interval syntax elements is used so signal the interval that is used for the sub-picture output of the DPB.

In this embodiment, the sub-picture output of the DPB has the size of a DU or a sub-picture, i.e. at every sub-picture output a copy of a sub-picture in the DPB is transferred to the output sink. Thus, in this embodiment, the size of the data sink can be of DU or sub-picture size.

The next step of the partial picture output scheme includes marking a decoded DUs in the DPB as being ready for partial output. This marking may be a label or a flag that signals the decoder apparatus not to remove the one or more decoded DUs from the DPB. With regards to marking the picture for reference and for removal, these markings concern markings of the whole picture and thus does not interfere with the marking of a DU for partial picture output.

The next step of the partial picture scheme may include copying the one or more marked decoded DUs from the DPB to the data sink without removing the one or more decoded DU from the DPB. Further, an application associated with the data sink may be signalled that a partial output of the DPB has been performed.

In a first embodiment, the partial picture output may have the same size as the coded picture. Thus, in case of a partial picture output, decoded DUs in the DPB are copied to the data sink and the decoder may mark the decoded DUs to be available for partial output, but not removal of the DPB yet. The timing of the partial output can be either 'as-soon-as-possible' or determined by HRD parameters that would specify the time for each of these partial outputs. In low-delay applications, the application may want to have the data as soon as possible, without any further delay. In that case, a flag may be used to indicate that a partial picture output is available in the data sink so that the renderer or other post-processing device may make a decision to either show the same frame twice or show the partially new frame.

In an embodiment, an application may be informed about the decoding status of a picture. The status information may identify which areas of the picture are already decoded and/or which areas of the picture are not yet decoded. In an embodiment, such area in the picture may define a group of pixels of one or more decoded DUs. This way, the application is informed which decoded pixel values are made available in a data sink by the decoder. Table 4 below shows an example of the syntax of an update message.

TABLE 4 syntax of a decoding status message

| | Descriptor |
|---|---|
| completion_status_of_decoded_picture( ){ | |
|   incomplete_flag | u(1) |
|   if( incomplete_flag ){ | |
|     num_incomplete_areas | ue(v) |
|     for( incomplete area=0; area< num_incomplete_areas; incomplete_area ++){ | |
|       origin_width | u(v) |
|       origin_height | u(v) |
|       width | u(v) |
|       height | u(v) |
|     } | |
|   } | |
| } | |

As shown in this table, the message includes different syntax elements for monitoring the decoding status of a picture. The message may include a flag, incomplete_flag, for signalling if the picture is fully decoded or not. The message will be updated during decoding until each area is filled in with DU pixels. This message or at least the information in the message may signalled to an application at every partial output. In an embodiment, the message may be signalled by a decoder API to the application. The meaning of the syntax elements may be as follows:

| | |
|---|---|
| incomplete_flag | whether the full picture is decoded or not. If the flag is 0 then the image is complete, if the flag is 1 then there are still regions to be filled in. |
| num_incomplete_areas | number of areas that need to be described as incomplete |
| origin_width | origin of an incomplete area in the x axis |
| origin_height | origin of an incomplete area in the y axis |
| width | width of the area to be described |
| height | height of the area to be described |

Figure 7:
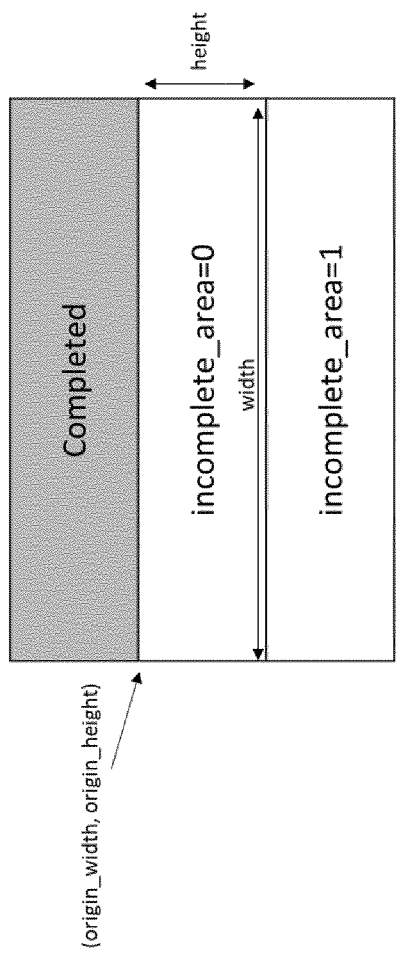
FIG. 7 depicts a buffer output scheme according to an embodiment of the invention.

Thus, the number of areas in the picture that do not yet comprise decoded pixel values (representing DUs that still need to be decoded) may be signalled as well as the dimension of each area and the position of each area of the picture that is not yet decoded. FIG. 7 depicts an example of a picture in the DPB during decoding, including three areas of the picture wherein pixels of the top area are already decoded and pixels of the two other areas are not yet decoded. Each time a DU is decoded, stored in the allocated memory of the DPB and marked for partial output, the decoding status message of the picture may be updated and signalled to the application. One the decoding of the picture is finalized the flag may signal that the decoding process of the picture is finished. In that case, process of decoding the next picture may be started.

The decoded picture buffer may store all decoded pictures that are decoded and used in the decoding process. The stored pictures are used for two processes:
 1. pictures are stored in the DPB for output to the data sink so that these pictures can be processed by a rendering process.
 2. pictures are stored in the DPB to serve as reference pictures for pictures that still need to be decoded.

Figure 8:
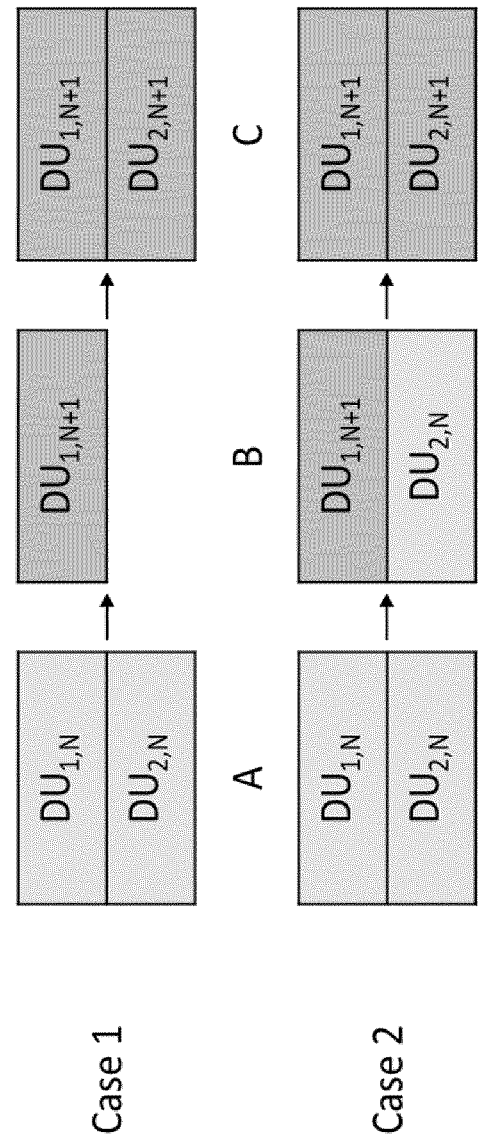
FIG. 8 depicts a buffer output scheme according to another embodiment of the invention.

FIG. 8 illustrates the progression of filling the DPB with decoded DUs of three pictures A, B and C. Case 1 illustrates a process wherein picture B is not fully decoded (only $DU_{1,N+1}$ is decoded and stored in the DPB). In that case, picture B cannot be used as a reference case and thus will be discarded. In contrast, in case 2 the decoded DUs of picture A are taken as a base for picture B. Then, when the first DU of picture B is decoded it is copied into the allocated memory of picture B overwriting pixel values that belong to the first DU of picture A. In that case, picture B is still useful as a reference for future frames (a high-level overview of the output buffer type for this case is illustrated in FIG. 9C).

Figure 9A:
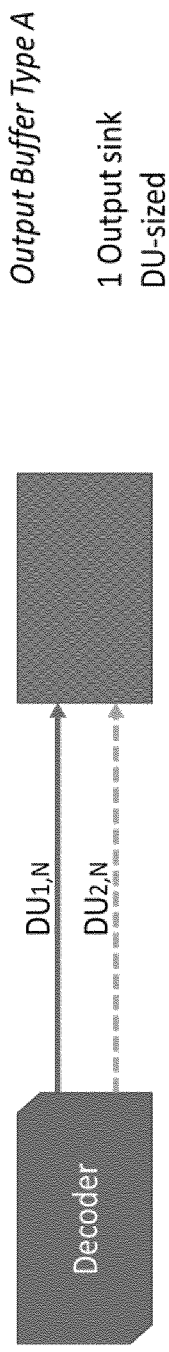
FIG. 9A-9C depicts buffer output schemes according to various embodiments of the invention.
Figure 9B:
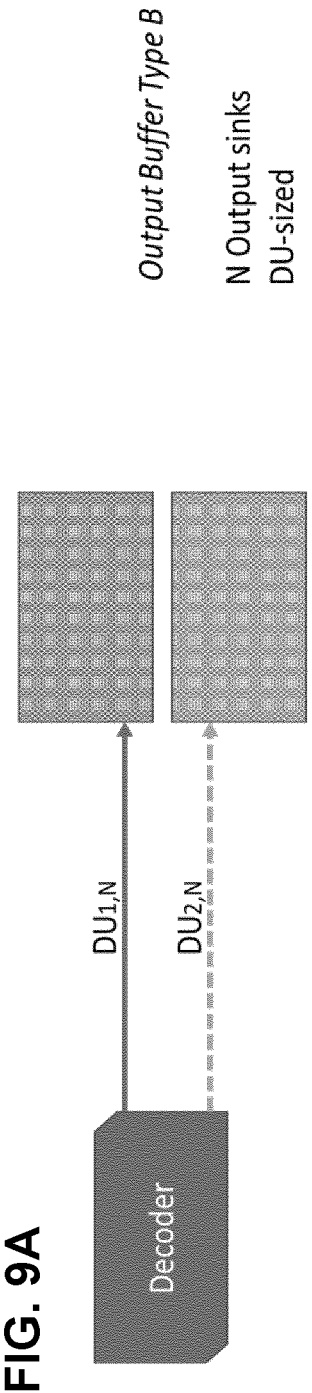
Figure 9C:
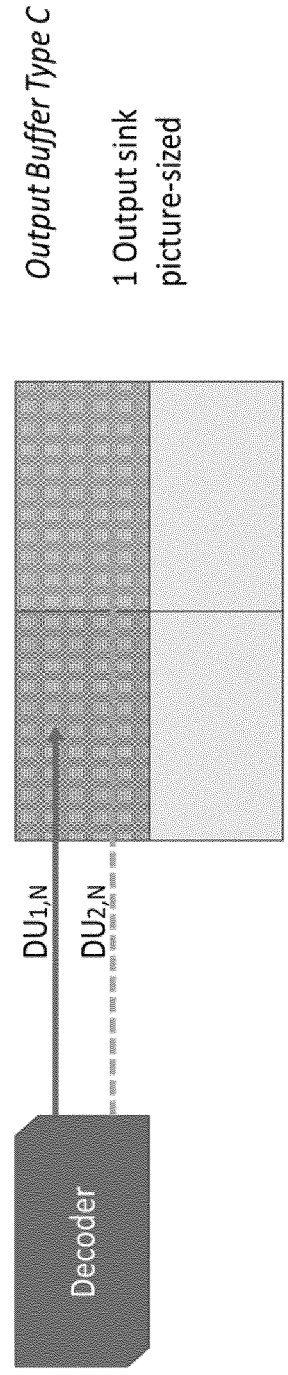

FIG. 9A-9C depicts different architectures of data sinks that can be used with the embodiments according to the invention. The data sinks include a first data sink (type A) which includes one buffer that has a size that matches the size of a DU, a first data sink (type B) comprising a plurality of buffers, wherein each buffer has a size that matches the size of a DU and a third data sink (type C) that has a buffer that has a size that matches the size of a picture.

FIG. 9A depicts a 1 DU-sized data sink. Such architecture may be used if all DUs have the same size and allows one data sink (e.g. file pointer, computer socket, memory pointer, etc.) of small size. However, as every new DU that is outputted will overwrite the DU that is stored in the data sink, close monitoring by the application and synchronization with the decoder regarding the outputting of a decoded DU from the CPB into the data sink are required. This approach may be used for systems where memory is a main constraint, but there is enough processing power and timing fidelity to utilize the DUs as the arrive, before they are flushed to be replaced from the next one.

FIG. 9B depicts a data sink comprising a plurality of DU-sized data sinks, a N DU-sized sink. Such architecture may be used if DUs are of different sizes and assumes that the number of DUs is constant for the whole sequence, or at least the number of DU can be inferred from the bitstream by the decoder fora certain part of the sequence. This architecture allows for more flexibility when compared to the data sink of FIG. 9A in the sense that at a given time more DUs are available for processing. Such approach is suitable when batch processing of DUs may be used or if the processing power is not constant However, also in this case close monitoring by the application and synchronization with the decoder regarding the outputting of a decoded DU from the CPB into the data sink are required. T FIG. 9C depicts a picture-sized data sink. This embodiment may be used in combination with HEVC tiles or VVC sub-pictures for which the DUs belong to the same picture but can be decoded independently from one another. The decoding status message as described above with reference to table 4 may be used to monitor and signal the filling of the data sink with decoded DUs.

For all cases, the application can update the sink(s) by polling the sink in regular intervals to identify if there was an update (i.e. a new DU was decoded). Alternatively or in addition a callback event may be generated by e.g. the decoder API every time the sink is updated. A hybrid approach may also be possible where the main update mechanism is polling the sinks regularly and using a callback event which is only fired for specific events (e.g. initializing the sink, switch decoding from the DUs of one AU to DUs of another without the first one being completely decoded yet etc.). The application may use the callback information to adjust the polling frequency and/or timing.

Figure 10:
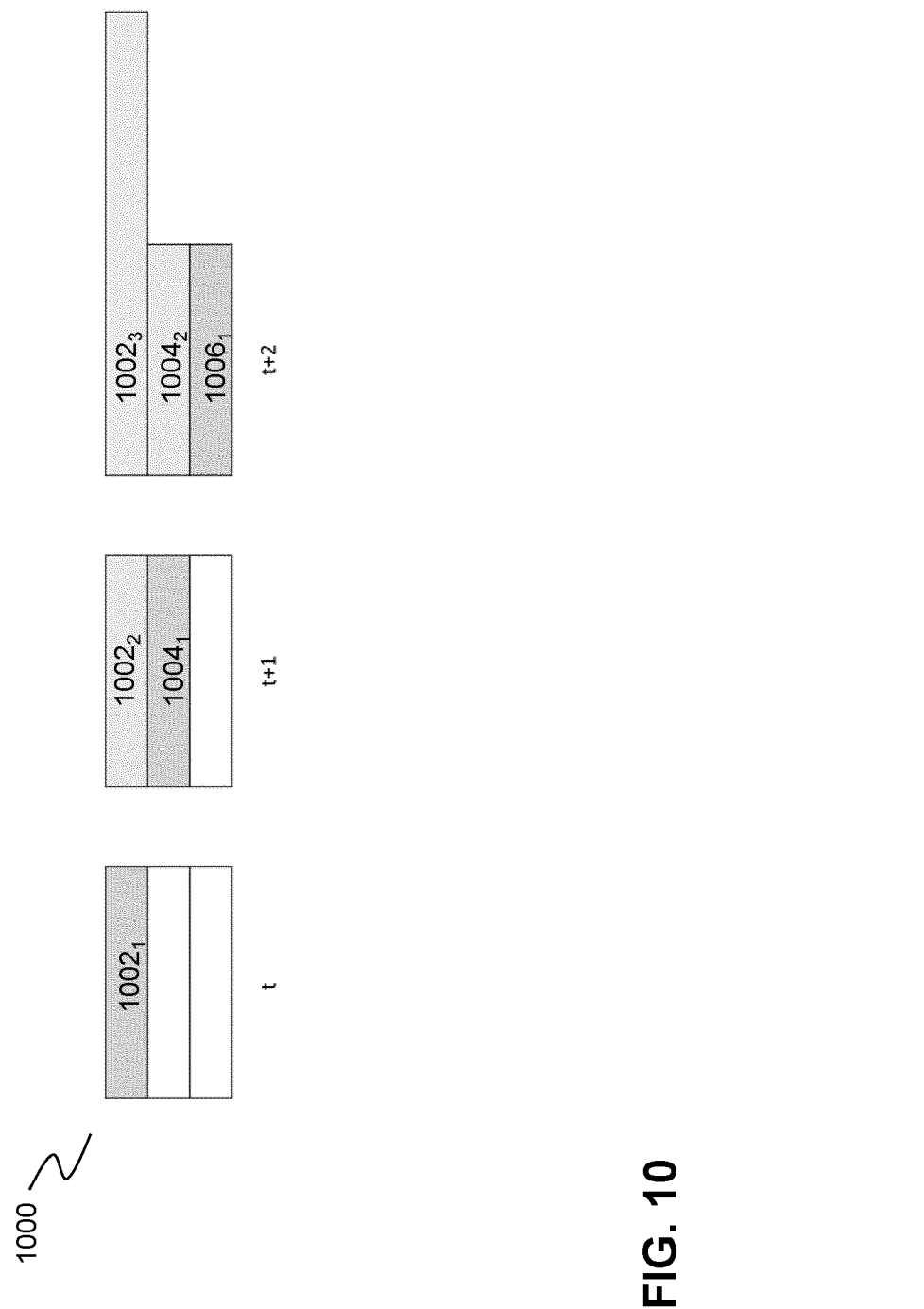
FIG. 10 depicts an example of the partial readout scheme according to an embodiment of the invention.

FIG. 10 depicts an exemplary use of the invention wherein post-process of part of the partially outputted decoded data can already start while the decoding of the full picture is not finished yet. The figure schematicall depicts a picture 1000 comprising three DUs. At time t, the decoding of the first DU $1002_1$ may be finished so that a partical output can be performed by copying the decoded DU in the data sink. An application may use that data to perform an operation such as upscaling. Meanwhile, the decoder may continue decoding and finish decoding of a second DU $2004_1$ at t+1, while the application is upscaling the first DU $2002_2$. In t+2 the first upscaled DU $1002_3$ is finalized, the second DU $2004_2$ is upscalled by the application while the third DU $2006_1$ is decoded.

Figure 11:
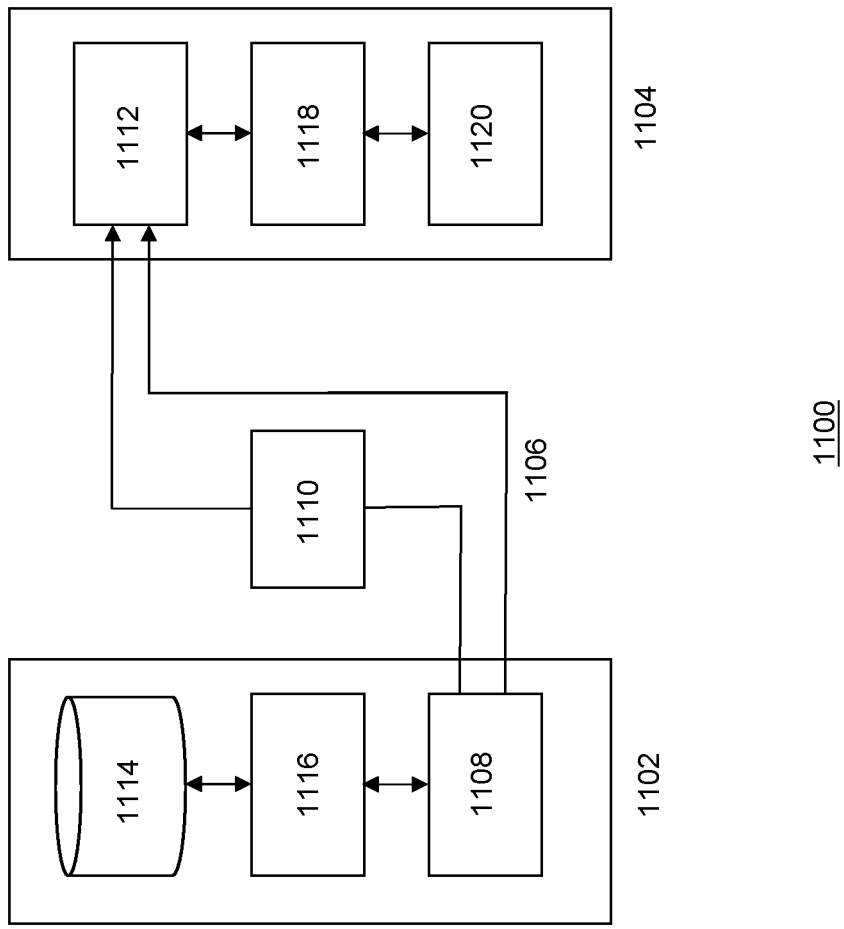
FIG. 11 depicts a block diagram illustrating an exemplary data processing system that may be used with embodiments described in this disclosure.

FIG. 11 depicts a schematic of a video encoding and decoding system 1100 that may use the techniques described in this application. As shown in FIG. 11, system 1100 may include a first video processing device 1102, e.g. a video capturing device or the like, configured to generate encoded video data which may be decoded by a second video processing device 1104, e.g. a video playout device. First and second video processing devices may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, The video processing devices may be equipped for wireless communication.

The second video processing device may receive the encoded video data to be decoded through a transmission channel 1106 or any type of medium or device capable of moving the encoded video data from the first video processing device to the second video processing device. In one example, the transmission channel may include a communication medium to enable the first video processing device to transmit encoded video data directly to the second video processing device in real-time. The encoded video data may be transmitted based on a communication standard, such as a wireless communication protocol, to the second video processing device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, servers or any other equipment that may be useful to facilitate communiction between first and second video processing devices.

Alternatively, encoded data may be sent via an I/O interface 1108 of the first video processing device to a storage device 1110. Encoded data may be accessed by input an I/O interface 1112 of the second video processing device. Storage device 1110 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may hold the encoded video generated by the first video processing device. The second video processing device may access stored video data from storage device via streaming or downloading. The file server may be any type of server capable of storing encoded video data and transmitting that encoded video data to the second video processing device. Example file servers include a web server (e.g., for a website), an FTP server, network attached storage (NAS) devices, or a local disk drive. The second video processing device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 1100 may be configured to support one-way or two-way video transmission to support applications such as video streaming, video playback, video broadcasting, and/or video telephony.

In the example of FIG. 11, the first video processing device may further include a video source 1114 and a video encoder 1116. In some cases, I/O interface 1108 may include a modulator/demodulator (modem) and/or a transmitter. The video source may include any type of source such as a video capture device, e.g., a video camera, a video archive containing previously captured video, a video feed interface to receive video from a video content provider, and/or a computer graphics system for generating computer graphics data as the source video, or a combination of such sources. If video source 1114 is a video camera, the first and second video processing device may form so-called camera phones or video phones. However, the techniques described in this disclosure may be applicable to video coding in general, and may be applied to wireless and/or wired applications.

The captured, pre-captured, or computer-generated video may be encoded by video encoder 1116. The encoded video data may be transmitted directly to the second video processing device via I/O interface 1108. The encoded video data may also (or alternatively) be stored onto storage device 1110 for later access by the second video processing device or other devices, for decoding and/or playback.

The second video processing device may further comprise a video decoder 1118, and a display device 1120. In some cases, I/O interface 1112 may include a receiver and/or a modem. I/O interface 1112 of the second video processing device may receive the encoded video data. The encoded video data communicated over the communication channel, or provided on storage device 1110, may include a variety of syntax elements generated by video encoder 1116 for use by a video decoder, such as video decoder 1118, in decoding the video data. Such syntax elements may be included with the encoded video data transmitted on a communication medium, stored on a storage medium, or stored a file server.

Display device 1120 may be integrated with, or external to, the second video processing device. In some examples, second video processing device may include an integrated display device and also be configured to interface with an external display device. In other examples, second video processing device may be a display device. In general, display device displays the decoded video data to a user, and may comprise any of a variety of display devices such as a liquid crystal display (LCD), a plasma display, an organic light emitting diode (OLED) display, or another type of display device.

Video encoder 1116 and video decoder 1118 may operate according to a video compression standard, such as the High Efficiency Video Coding (HEVC), VP9, AV1 or VVC. Alternatively, video encoder 1116 and video decoder 1118 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

Although not shown in FIG. 11, in some aspects, video encoder 1116 and video decoder 1118 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 1116 and video decoder 1118 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 1116 and video decoder 1118 may be included in one or more encoders or decoders, either of which may be integrated as part of a combined encoder/decoder (CODEC) in a respective device.

This disclosure may generally refer to video encoder "signaling" certain information to another device, such as video decoder. The term "signaling" may generally refer to the communication of syntax elements and/or other data (metadata) used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method of processing video data of a picture, the method including:
   a processor of a decoding apparatus allocating memory for a decoded picture in a decoded picture buffer, DPB, the decoded picture comprising pixels representing video data;
   the processor receiving a bitstream comprising decoding units, DUs, and storing the DUs in a coded picture buffer, CPB, the DUs representing a coded picture that needs to be decoded into the decoded picture, each of the DUs representing a coded block of pixels;
   the processor determining if, during decoding of the coded picture, at least one partial output can be performed, the at least one partial output including copying one or more decoded DUs from the DPB to a data sink, while one or more DUs of the coded picture are not yet decoded and removed from the CPB, the one or more decoded DUs representing a part of the decoded picture; and,
   the processor performing the at least one partial output if the processor determines that the at least one partial output can be performed, the performing including:
   marking the one or more decoded DUs stored in the DPB as being ready for partial output, the marking signaling the decoder apparatus not to remove the one or more decoded DUs from the DPB;
   copying the one or more marked decoded DUs from the DPB to the data sink without removing the one or more decoded DUs from the DPB; and
   signaling an application associated with the data sink that the partial output of the DPB has been performed.

2. Method according to claim 1, wherein determining if at least one partial output can be performed includes:
   determining if inloop-filtering of the picture is disabled or not.

3. Method according to claim 1, wherein determining if partial output can be performed includes:
   the processor receiving decoding information associated with the picture, preferably a SEI message, such as a picture timing SEI message, the decoding information including a partial output indicator, preferably a partial output flag, for signaling the decoder apparatus if partial output of decoded DUs representing part of a decoded picture can be performed.

4. Method according to claim 1, wherein determining if partial output can be performed includes:
   the processor receiving decoding information associated with the picture, preferably a SEI message, such as a picture timing SEI message, the decoding information signaling the decoder apparatus that partial output can be performed if the bitstream should be processed on a DU level as specified in HEVC or as a sub-picture as specified in VVC.

5. Method according to claim 4 wherein the decoding information associated with the picture further includes timing information for performing the one or more partial outputs of the decoded DUs.

6. Method according to claim 1 wherein the data sink includes a buffer that matches the size of a DU, the transfer of at least part of the DPB to a data sink including:
   copying the decoded DU in the DPB to the buffer of the data sink.

7. Method according to claim 1 wherein the data sink has n buffers, wherein n is the number of the plurality of DUs and wherein each of the n buffers matches the size of one of the plurality of DUs, the transfer of at least part of the DPB to a data sink including:
   copying the decoded DU in one of the n buffers of the data sink.

8. Method according to claim 1 wherein the data sink has a buffer that matches the size of a picture, the transfer of at least part of the DPB to a data sink including:
   copying the DU into the buffer of the data sink at a position according to the position of the DU in the picture.

9. Method according to claim 1 wherein the signaling of the application includes:
   generating information associated with the decoding of the picture, the information including one or more of the following messages:
   a status message for signaling if the picture is fully decoded or not;
   the number of not yet decoded DUs;
   the location of the not yet decoded DUs in the picture.

10. Method according to claim 1 wherein a DU is a macroblock as defined in AVC, a coded tree unit, CTU, as defined in HEVC, a slice as defined in HEVC or VVC or a sub-picture as defined in VVC.

11. Method according to claim 1 wherein the decoding is based on an AVC, HEVC, VP9, AV1, VVC coding standard or a coding standard based on of the AVC, HEVC, VP9, AV1, VVC coding standards.

12. A computer program product comprising software code portions configured for, when run in the memory of a computer, executing the method steps according to claim 1.

13. A decoding apparatus comprising:
- a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising:
- the processor of a decoding apparatus allocating memory for a decoded picture in a decoded picture buffer, DPB, the decoded picture comprising pixels representing video data;
- the processor receiving a bitstream comprising decoding units, DUs, and storing the DUs in a coded picture buffer, CPB, the DUs representing a coded picture that needs to be decoded into the decoded picture, each of the DUs representing a coded block of pixels;
- the processor determining if, during decoding of the coded picture, at least one partial output can be performed, the at least one partial output including copying the one or more decoded DUs from the DPB to a data sink, while one or more DUs of the coded picture are not yet decoded and removed from the CPB, the one or more decoded DUs representing a part of the decoded picture; and,
- the processor performing the at least one partial output if the processor determines that the at least one partial output can be performed, the performing including:
  - marking the one or more decoded DUs stored in the DPB as being ready for partial output, the marking signaling the decoder apparatus not to remove the one or more decoded DUs from the DPB;
  - copying the one or more marked decoded DUs from the DPB to the data sink without removing the one or more decoded DUs from the DPB; and, optionally,
  - signaling an application associated with the data sink that the partial output of the DPB has been performed.

* * * * *